United States Patent
Curry et al.

(10) Patent No.: US 8,275,602 B2
(45) Date of Patent: Sep. 25, 2012

(54) INTERACTIVE CONVERSATIONAL SPEECH COMMUNICATOR METHOD AND SYSTEM

(75) Inventors: David G. Curry, Sedalia, MO (US);
Jason R. Curry, Kansas City, MO (US);
Chris Dyer, Lenexa, KS (US); Ken Conroy, Lenexa, KS (US); Roger Donley, Overland Park, KS (US)

(73) Assignee: sComm, Inc., Independence, MO (US)

( * ) Notice: Subject to any disclaimer, the term of this patent is extended or adjusted under 35 U.S.C. 154(b) by 1065 days.

(21) Appl. No.: 11/790,085

(22) Filed: Apr. 23, 2007

(65) Prior Publication Data
US 2008/0109208 A1 May 8, 2008

Related U.S. Application Data

(60) Provisional application No. 60/793,655, filed on Apr. 21, 2006, provisional application No. 60/793,627, filed on Apr. 21, 2006.

(51) Int. Cl.
*G06F 17/28* (2006.01)
(52) U.S. Cl. ......... 704/3; 704/5; 704/8; 704/9; 704/246; 704/251
(58) Field of Classification Search .......... None
See application file for complete search history.

(56) References Cited

U.S. PATENT DOCUMENTS

| | | | |
|---|---|---|---|
| 4,531,184 A | 7/1985 | Wigan et al. | |
| 4,599,612 A | 7/1986 | Kaji et al. | |
| 4,805,132 A | 2/1989 | Okamoto et al. | |
| 4,984,177 A | 1/1991 | Rondel et al. | |
| 5,119,319 A | 6/1992 | Tanenbaum | |
| 5,169,342 A | 12/1992 | Steele et al. | |
| 5,175,684 A | 12/1992 | Chong | |
| 5,268,839 A | 12/1993 | Kaji | |
| 5,338,976 A | 8/1994 | Anwyl et al. | |
| 5,351,189 A | 9/1994 | Doi et al. | |
| 5,608,622 A | 3/1997 | Church | |
| 5,612,872 A | 3/1997 | Fujita | |

(Continued)

FOREIGN PATENT DOCUMENTS
GB  2 311 888 A  10/1997
(Continued)

OTHER PUBLICATIONS

International Search Report for PCT/US2007/009755 Dated Oct. 19, 2007.

(Continued)

*Primary Examiner* — Leonard Saint Cyr
(74) *Attorney, Agent, or Firm* — Nixon Peabody LLP; Jeffrey L. Costellia

(57) ABSTRACT

The compact and portable interactive system allows person-to-person communication in a typed language format between individuals experiencing language barriers such as the hearing impaired and the language impaired. The communication system includes a custom configuration having a display screen and a keyboard, a data translation module for translating the original data from a first language type to a second language type. The display screen shows a split configuration with multiple dialogue boxes to facilitate simultaneous display of each user's input. The system supports multilingual text-based conversations as well as conversion from audio-to-text and text-to-audio conversations. Translation from one communication format to a second communication format is performed as messages are transmitted between users.

21 Claims, 15 Drawing Sheets

U.S. PATENT DOCUMENTS

| | | | |
|---|---|---|---|
| 5,615,301 | A | 3/1997 | Rivers |
| 5,712,901 | A | 1/1998 | Meermans |
| 5,715,466 | A | 2/1998 | Flanagan et al. |
| 5,724,526 | A | 3/1998 | Kunita |
| 5,781,902 | A | 7/1998 | Waszkiewicz |
| 5,805,167 | A | 9/1998 | van Cruyningen |
| 5,852,800 | A | 12/1998 | Modeste et al. |
| 5,854,997 | A | 12/1998 | Sukeda et al. |
| 5,875,422 | A | 2/1999 | Eslambolchi et al. |
| 5,905,476 | A | 5/1999 | McLaughlin et al. |
| 5,917,484 | A | 6/1999 | Mullaney |
| 5,943,398 | A | 8/1999 | Klein et al. |
| 5,974,372 | A | 10/1999 | Barnes et al. |
| 5,987,401 | A | 11/1999 | Trudeau |
| 6,061,646 | A | 5/2000 | Martino et al. |
| 6,073,146 | A | 6/2000 | Chen |
| 6,119,078 | A | 9/2000 | Kobayakawa et al. |
| 6,122,606 | A | 9/2000 | Johnson |
| 6,161,082 | A | 12/2000 | Goldberg et al. |
| 6,167,366 | A | 12/2000 | Johnson |
| 6,173,250 | B1 | 1/2001 | Jong |
| 6,205,418 | B1 | 3/2001 | Li et al. |
| 6,208,956 | B1 | 3/2001 | Motoyama |
| 6,240,392 | B1 | 5/2001 | Butnaru et al. |
| 6,307,549 | B1 | 10/2001 | King et al. |
| 6,618,704 | B2 | 9/2003 | Kanevsky et al. |
| 6,670,950 | B1 | 12/2003 | Chin et al. |
| 6,804,534 | B2 | 10/2004 | Lai et al. |
| 6,980,953 | B1 | 12/2005 | Kanevsky et al. |
| 7,023,969 | B2 | 4/2006 | Pines et al. |
| 7,039,393 | B1 | 5/2006 | Kite |
| 7,072,941 | B2 | 7/2006 | Griffin et al. |
| 7,142,642 | B2 | 11/2006 | McClelland et al. |
| 7,277,858 | B1 | 10/2007 | Weaver et al. |
| 7,315,612 | B2 | 1/2008 | McClelland |
| 7,346,157 | B2 | 3/2008 | Pines et al. |
| 7,430,283 | B2 | 9/2008 | Steel, Jr. |
| 7,519,652 | B2 | 4/2009 | Page et al. |
| 7,555,521 | B1 | 6/2009 | McLaughlin et al. |
| 7,573,985 | B2 | 8/2009 | McClelland et al. |
| 7,640,293 | B2 | 12/2009 | Wilson et al. |
| 2002/0173965 | A1 | 11/2002 | Curry et al. |
| 2004/0073432 | A1 | 4/2004 | Stone |
| 2005/0149318 | A1* | 7/2005 | Honda et al. ............ 704/9 |
| 2005/0174997 | A1* | 8/2005 | Hinde et al. ............ 370/352 |
| 2006/0025214 | A1* | 2/2006 | Smith ............ 463/30 |
| 2006/0206309 | A1 | 9/2006 | Curry et al. |
| 2006/0288077 | A1 | 12/2006 | Chen |
| 2008/0005294 | A1 | 1/2008 | Morris |
| 2008/0261181 | A1 | 10/2008 | Kennedy et al. |
| 2009/0047989 | A1 | 2/2009 | Harmon et al. |
| 2010/0262650 | A1 | 10/2010 | Chauhan et al. |
| 2011/0246606 | A1 | 10/2011 | Barbeau et al. |

FOREIGN PATENT DOCUMENTS

| | | |
|---|---|---|
| WO | WO 02/100066 A1 | 12/2002 |
| WO | WO 2008/092148 A1 | 7/2008 |
| WO | WO 2011/119838 A1 | 9/2011 |

OTHER PUBLICATIONS

Written Opinion of the International Searching Authority for PCT/US2007/009755.

U.S. Appl. No. 09/859,059, Notice of Allowance, dated Aug. 19, 2005.

U.S. Appl. No. 09/859,059, Amendment, dated Dec. 23, 2004.

U.S. Appl. No. 09/859,059, non-final Office Action, dated Jun. 23, 2004.

U.S. Appl. No. 09/859,059, Preliminary Amendment, dated Jul. 30, 2002.

U.S. Appl. No. 09/859,059, Specification, Claims, Abstract and Drawings, dated May 17, 2001.

U.S. Appl. No. 11/290,513, non-final Office Action, dated Nov. 17, 2006.

U.S. Appl. No. 11/290,513, Preliminary Amendment, dated May 8, 2006.

U.S. Appl. No. 11/290,513, Preliminary Amendment, dated Apr. 17, 2006.

U.S. Appl. No. 11/290,513, Specification, Claims, Abstract and Drawings, dated Dec. 1, 2005.

U.S. Appl. No. 11/290,513, Preliminary Amendment, dated Dec. 1, 2005.

Ballesteros et al., "Phrasal Translation and Query Expansion Techniques for Cross Language Information Retrieval," pp. 84-91, 1997, Ctr. for Intelligent Info. Retrieval, C.S. Dept., UMASS Amherst.

Sheridan et al., "Experiments in Multilingual Info Retrieval Using the SPIDER System," pp. 58-65, 1996, Swiss Federal Institute of Technology.

U.S. Appl. No. 12/732,144, non-final Office Action, dated Dec. 21, 2011.

Yeh et al., "Designing an Integrated Voice, Video, and Instant Message Service System in SIP-Based IP Networks," TENCON 2006, 2006 IEEE Region 10 Conference, Nov. 14-17, 2006, pp. 1-4, Hong Kong.

"AnnieS: Home," http://www.annies.nl/, accessed Dec. 2, 2009, 3 pages.

"Welcome to 4C telecom," http://www.4ctelecom.net/annies.html, accessed Nov. 5, 2009, 1 page.

"NXi Communications," http://www.nxicom.co/text_communications.html, accessed Dec. 2, 2009, 2 pages.

Kruyer, "How Real Time Text contributes to a global community of communication," IFHOH Journal, Dec. 2008, pp. 5-6.

Schulzrinne et al., "The Session Initiation Protocol: Internet-Centric Signaling," Communications Magazine, IEEE, Oct. 2000, vol. 38, No. 10, pp. 134-141.

"3rd Generation Partnership Project: Technical Specification Group Services and System Aspects; End-to-End QoS Concept and Architecture," 3G TS 23.207 V1.1.2 (May 2001), 51 pages.

International Application No. PCT/US2011/029801, International Search Report and Written Opinion, dated Sep. 7, 2011, 14 pages.

* cited by examiner

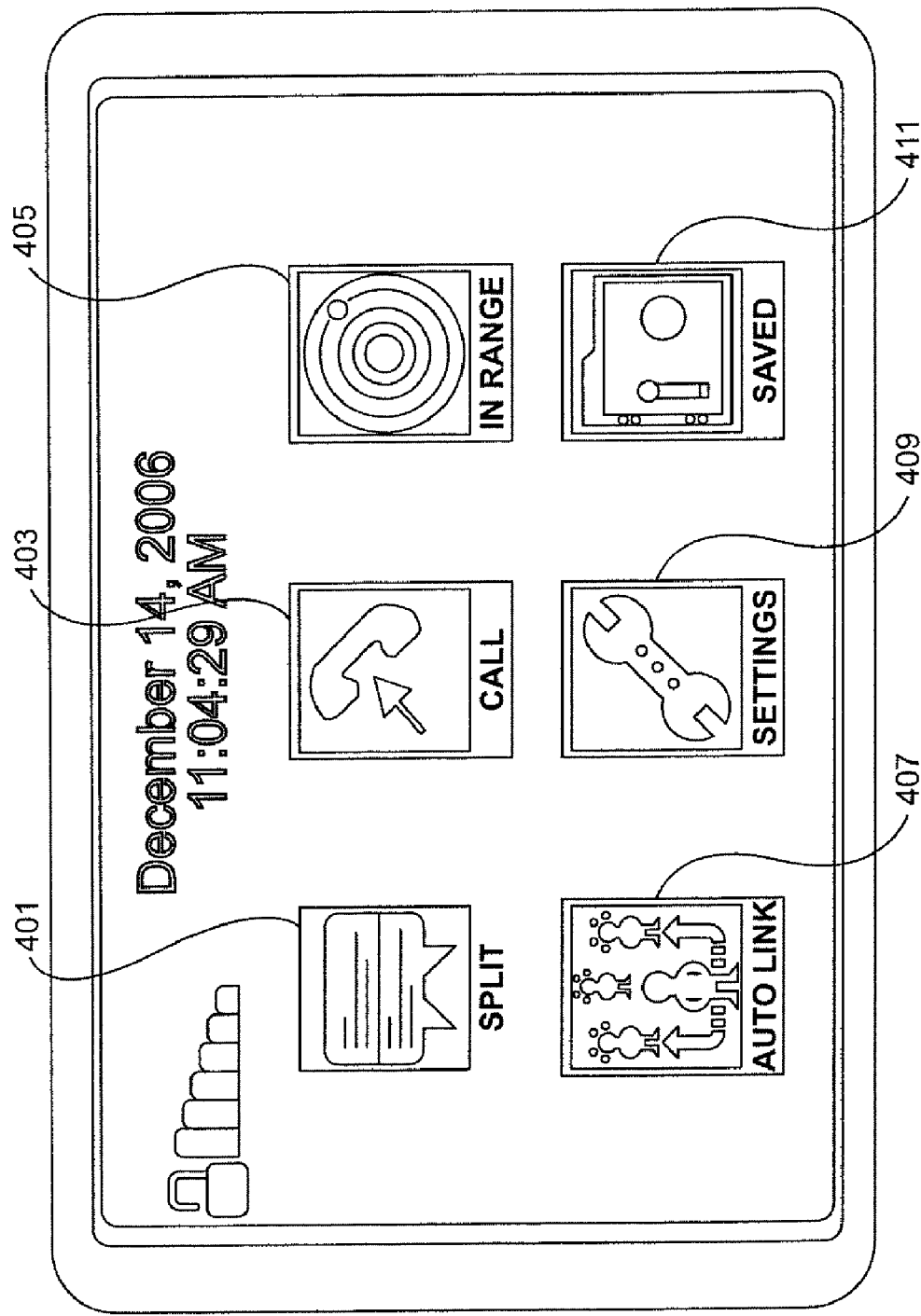

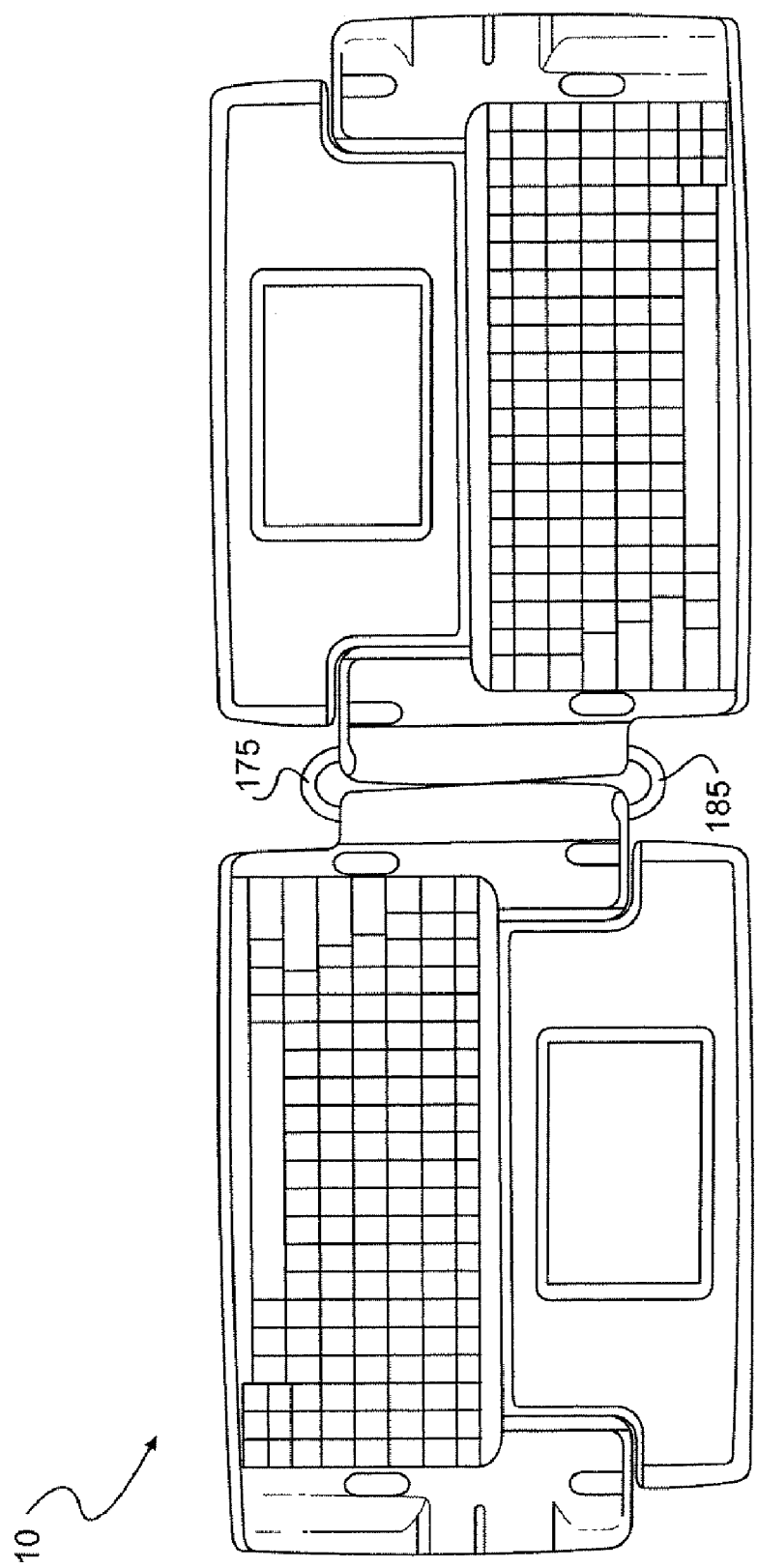

BROADCAST MODE WITH Q&A SESSION

DEPICTION OF THE BROADCAST TEXT ENTRY
WINDOW AND CHAT SESSION FOR Q&A

AUDIENCE MODE
DEPICTION OF THE THREE UNITS
REFERRED TO IN THIS USE CASE

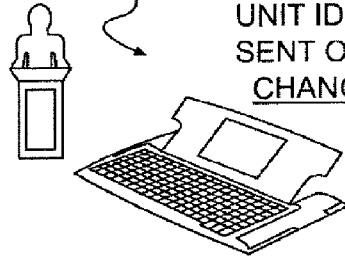

811

UNIT ID SET TO PODIUM
SENT OUT REQUEST FOR BROADCAST TITLED
CHANGE TO COMPANY 401K PLAN FOR 2006

813

UNIT ID SET TO SARA JONES
ACCEPTED REQUEST FOR BROADCAST TITLED
CHANGE TO COMPANY 401K PLAN FOR 2006

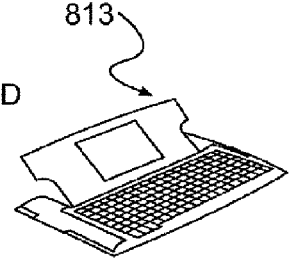

815

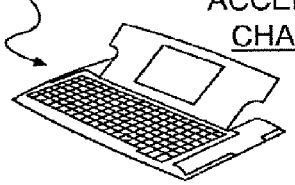

UNIT ID SET TO BILL SMITH
ACCEPTED REQUEST FOR BROADCAST TITLED
CHANGE TO COMPANY 401K PLAN FOR 2006

DEPICTION OF THE DISPLAY ON 'PODIUM',
THE INITIAL BROADCAST REQUEST WINDOW

817

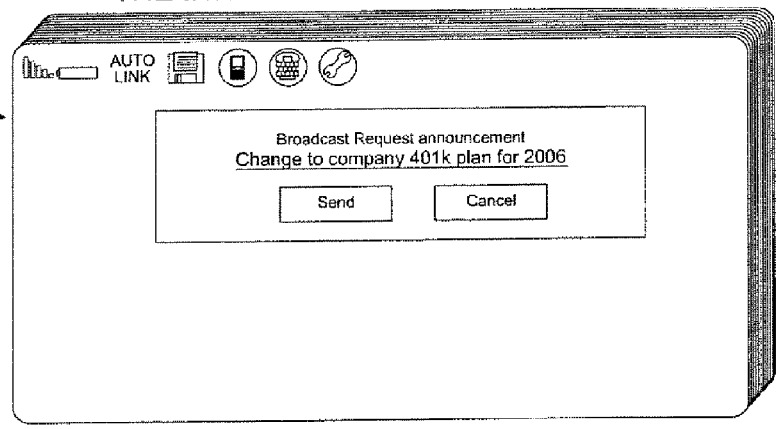

*FIG. 8A*

INTERACTIVE CONVERSATIONAL SPEECH COMMUNICATOR METHOD AND SYSTEM

CROSS REFERENCE TO RELATED APPLICATIONS

The present application is based upon and claims the benefit of priority of U.S. Provisional Patent Application Ser. No. 60/793,655 by David G. Curry, et al. entitled "Interactive Conversational Speech Communicator Method and System" filed Apr. 21, 2006, and U.S. Provisional Patent Application Ser. No. 60/793,627 by David G. Curry, et al. also entitled "Interactive Conversational Speech Communicator Method and System" also filed Apr. 21, 2006. The entire contents of both provisional patent applications are specifically incorporated by reference in this application for all they disclose and teach.

FIELD OF THE INVENTION

This invention relates generally to a portable interactive conversational speech communicator system. In particular, one embodiment of this invention relates to portable interactive conversational speech communicators with separate screens and keyboards allowing at least two individuals to communicate in real time with simultaneous exchange of messages without the use of a human translator.

BACKGROUND OF THE INVENTION

Over 28 million people in the United States experience some degree of hearing loss. Approximately four million of those are profoundly deaf. Many of these hearing-impaired individuals are confronted with barriers that impede their ability to effectively communicate with others. Such barriers include the inability to use spoken language, the inability of others to use and understand sign language, and the inability to understand the language being spoken to them.

Conversations with the hearing-impaired are becoming increasingly limited due to the lack of sign language skills of most individuals. Those individuals who do not have a broad range of sign language skills are faced with a limited amount of resources available in order to effectively communicate with the hearing-impaired. For example, the use of hand written notes, the use of gestures and closed captioning devices are commonly used. Lip reading is also commonly used. However, all of these techniques are limiting for the hearing-impaired because intricate, involved conversations are not possible without the aid of a human interpreter, or the time-consuming and frustrating necessity of passing notes back and forth. Further, the use of a human interpreter is often difficult to arrange as well as expensive.

Individuals who cannot speak or hear, or individuals who are unable to verbalize communication in the language at hand, experience difficulties in performing everyday tasks such as communicating with retail clerks, law enforcement officials, teachers, neighbors, co-workers, and the like. Both the personal family scenario and the professional scenario are hampered by the communication barriers.

In addition, hearing-impaired professionals are confronted with business associates who do not read lips, do not use sign language, or otherwise are restricted in their ability to communicate with deaf or hearing-impaired colleagues. In this instance, the use of interpreters is an expensive necessity. However, the need to have private interactive conversations with deaf associates without a third party present, that is without an interpreter, particularly conversations of a sensitive nature, is a growing concern.

Medical professionals are confronted everyday with the need to communicate with patients who do not hear well or who may be deaf. In these time-sensitive and sometimes life-threatening situations, there is not always enough time to find a human interpreter in order to quickly diagnose the problem at hand.

Hence, there is a need to provide a portable interactive conversational speech communicator system that allows two or more individuals to converse without regard to the individual's language capabilities or ability to hear.

SUMMARY OF THE INVENTION

The present invention has been developed with the view to substantially change the way individuals communicate on a global scale by using an interactive speech communicator system. The interactive speech communicator system is a tool especially useful for people who are deaf, hard of hearing, or for those speaking a foreign language. The hearing or speaking-impaired will be able to seamlessly converse with others without the need for a translator or sign language expert. Businessmen of different cultures and languages will be able to converse in conference rooms around the world without the necessity of having a human interpreter by using the interactive speech communicator system.

The interactive speech communicator system provides a system for breaking down barriers in communication for people with hearing loss or for those who speak foreign languages by allowing such individuals to comprehend typed language in an interactive two-way environment, without the need for a human translator or sign language expert.

The invention relates to a compact and portable interactive system for allowing person-to-person communication in a text-based language format between individuals. According to one embodiment of the present invention, the interactive speech communicator system includes multiple customized communication devices including display screens and keyboards on each communication device and data translation means for converting original typed data or speech or other language data from a first user to a second user. The display screens may further have a split configuration, with multiple chat boxes to display the text of each user simultaneously as the text is entered. The simultaneous display effectively simulates an oral conversation without the time lag often present when employing a human translator or sign language interpreter.

The interactive speech communicator system may include a portable, wireless, battery-powered, stand-alone communication device that facilitates simultaneous face-to-face communication by means of two displays and two keyboards. The communication device also includes rechargeable battery packs as well as an "instant-on" feature that enables the communication device to be ready to use within a few seconds of power-on.

Further, in accordance with one embodiment of the present invention, users of the portable interactive speech communicator system will be able to communicate directly with each other by utilizing the portable device configuration and typing written text. The typed text can be displayed, for example, in respective chat boxes or display windows in either the originally typed language or in a selected translated language. The interactive speech communicator system supports multilingual text-based conversations. As such, one chat box can display English text and another chat box can display the same text message, but in Spanish, French, German, or Chinese, for example.

Further in accordance with an embodiment of the present invention, the keyboards used in the interactive speech communicator system can be standard keyboards or custom keyboards. The custom keyboards can include special shortcut keys, touch screen input recognition buttons, sign language characters, emoticons, customized icons, and foreign language symbols. For example, external keyboards including one-handed keyboards and other specialty keyboards may be connected to the interactive speech communicator system to serve as input means, while Braille writing devices may be connected to the interactive speech communicator system to serve as output means. Additional output devices such as video monitors may also be connected to the interactive speech communicator device to enable additional viewers to read text messages and to participate in the dialogue sessions. Additionally, the interactive speech communicator system may include further options such as video conferencing hardware and software to provide video communication means for communicants as well. Similarly, these I/O devices may be integral to the interactive speech communicator device or may connect externally through separate I/O ports.

Additional features include two-way, simultaneous communication over a communication line, such as a telephone line or other communication network, when one user is contacting another system user. Additional users may be added on each end of the conversation using the interactive speech communicator device wireless capabilities and conferencing capabilities. Both wireless and traditional wired access options are provided that provide functionality to enable multiple-way conference calling. Similarly, in a networked environment, the interactive speech communication device may be used to broadcast the text of one user to multiple receivers, such as in a class room or in a presentation environment when one speaker lectures to a class, when a presenter gives a talk to a conference, or in similar situations. This broadcasting ability may also include the ability for audience members to query the instructor or lecturer to interject questions or otherwise provide comments during the broadcast presentation. The questions may be displayed to all participants, or may be routed through the presenter's device, or through another intermediary or moderator. The interactive speech communicator system also provides its own isolated encrypted wireless frequency that cannot be tapped or otherwise corrupted by other wireless nodes in addition to traditional wired access options.

The communication device may also use a wireless connection to poll other wireless devices within a local range of distances. If a second communication device answers the poll, a user carrying the communication device is notified. The communication device may also relay the in-range notification to another device, such as a vibrating pager or other portable communication devices. For example, a user carries the interactive speech communicator device across a college campus in between classes. The interactive speech communicator device sends out a polling signal that may be received by other interactive speech communicator devices. When the transmission from the first interactive speech communicator device is picked up by a second device, both users are notified that there is another interactive speech communicator user in the near geographic area, and the two users may choose to communicate with each other using the interactive speech communicator system. Likewise, wired connections may be used in applications and modes where wireless connections are not permitted or are otherwise not desired. For example, a wired connection may also be used to poll networked devices that were previously connected or previously participated in a dialogue. For example, wired devices with permanent or semi-permanent IP addresses may be polled to inquire as to whether the communicants using these addresses wish to participate in a discussion. The interactive communication device of the present invention includes the capability to solicit communicants to participate in discussions in this fashion as well as in a portable wireless manner.

Additionally, in accordance with one embodiment of the present invention, the communication devices of the interactive speech communicator system allow communicants to stand or sit across from each other to communicate rather than attempting to alternate use of one keyboard and screen among multiple users.

Similarly, in accordance with an embodiment of the present invention, the split screen display configuration of the interactive speech communicator system allows each communicant to read what the other is saying simultaneously as it is being typed for rapid communication.

The invention can be implemented in numerous ways, including as a system and device for communicating, as a communication method, or as a computer readable medium with instructions stored on the medium to enable a user to practice the method or to use the system of the present invention.

As a portable system for supporting multilingual text-based conversations between two communicants, one embodiment of the invention includes a conversation processor residing in the portable interactive speech communicator device, for receiving, transmitting, and relaying the text-based messages on the split screens and a translation control processor, also residing in the portable interactive speech communicator device, for translating a text-based message from a first user to a second user, and vice versa.

As a method for providing multilingual text-based conversations between two communicants, one embodiment of the invention performs the operations of displaying a message in a first communicant's language in one dialogue box, determining whether the first communicant's language needs to be translated, translating the message, if necessary, and transmitting the message from the first communicant's device to the second communicant's device. The method also displays the received message in another dialogue box on the second communicant's display. Both the first and second communicants see what is being typed by each other and may respond accordingly without delays previously associated with interpreters and intermediaries.

As a computer readable medium containing program instructions for providing text-based conversations between communicants, an embodiment of the invention includes computer readable code devices for enabling communicants to engage in a conversation group, computer readable code devices providing a first message in a first communicant's language, computer readable code devices for translating the first message from the first communicant's language to a second communicant's language when the two communicants' languages are not the same, and computer readable code devices for displaying the messages in appropriate dialogue boxes on respective communication devices of the communicants.

These and other features and advantages of this invention are described in or are apparent from the following detailed description of this invention.

BRIEF DESCRIPTION OF THE DRAWINGS

Various embodiments of this invention will be described in detail, with reference to the following figures, where:

FIGS. 1A-1C illustrate perspective views of the interactive speech communicator system according to this invention;

FIGS. 3A-3C illustrate an interactive speech communication system as two communication devices in a joined configuration, in an un-joined configuration, and in a fully closed transport configuration.

FIGS. 8A-8C illustrate a use case example of the interactive speech communicator system used in Audience Mode.

DETAILED DESCRIPTION OF THE INVENTION

Figure 1A:
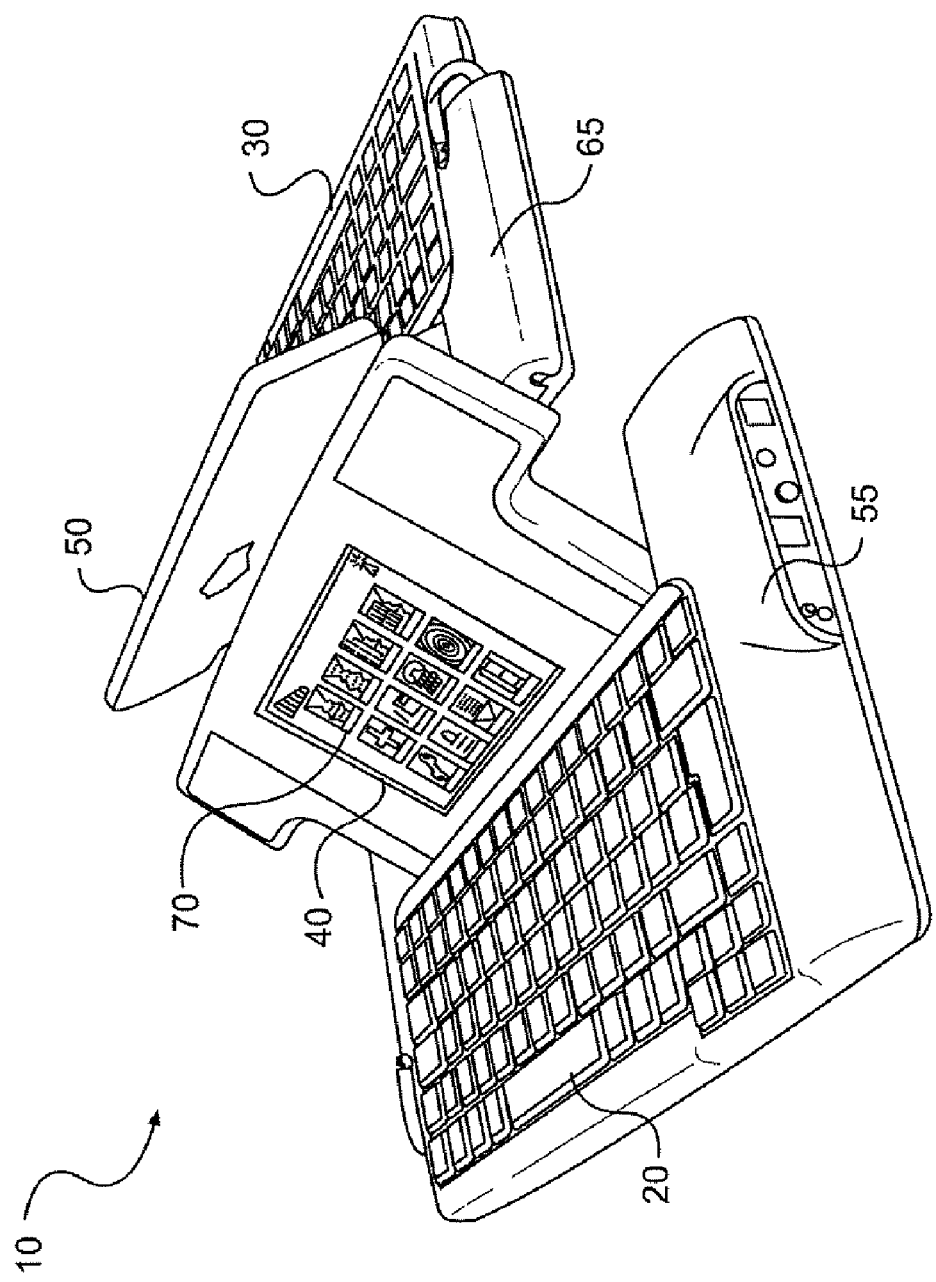

For a general understanding of the features of the present invention, reference is made to the drawings, wherein like reference numerals have been used throughout to identify identical or similar elements. While the present invention is described in terms of an illustrative embodiment or embodiments, it will be understood that the invention is adaptable to a variety of translation applications, such that the present invention is not necessarily limited to the particular embodiment or embodiments shown and described herein. To the contrary, the following description is intended to cover all alternatives, modifications, and equivalents, as may be included within the spirit and scope of the invention. Specially, it will be understood that the instant invention applies to all various types of translation applications, and it is not intended to be limited by the manner in which the conversations are relayed and/or translated.

As for the principles, the specific operation of the interactive speech communicator system relates to portable language communicator devices having language conversion techniques for text-based conversations. The data forming the text-based conversation is relayed from a first communicant to a second communicant as typed or is translated from a first communicant to a second communicant. The result is that both communicants can seamlessly converse in a text-based conversation even if one or both of the communicants is hearing impaired, speech impaired, or language impaired. The invention is particularly advantageous for those dealing with language barriers in communicating with those who cannot hear or who cannot understand spoken language.

A language-impaired user can carry around the portable interactive speech communicator system allowing him or her to converse with another without the need of a human translator or sign interpreter as though he or she was fluent in the conversation language. In addition, the language transcription and language translation may be performed in real-time, allowing seamless interaction with one another.

Figure 1B:
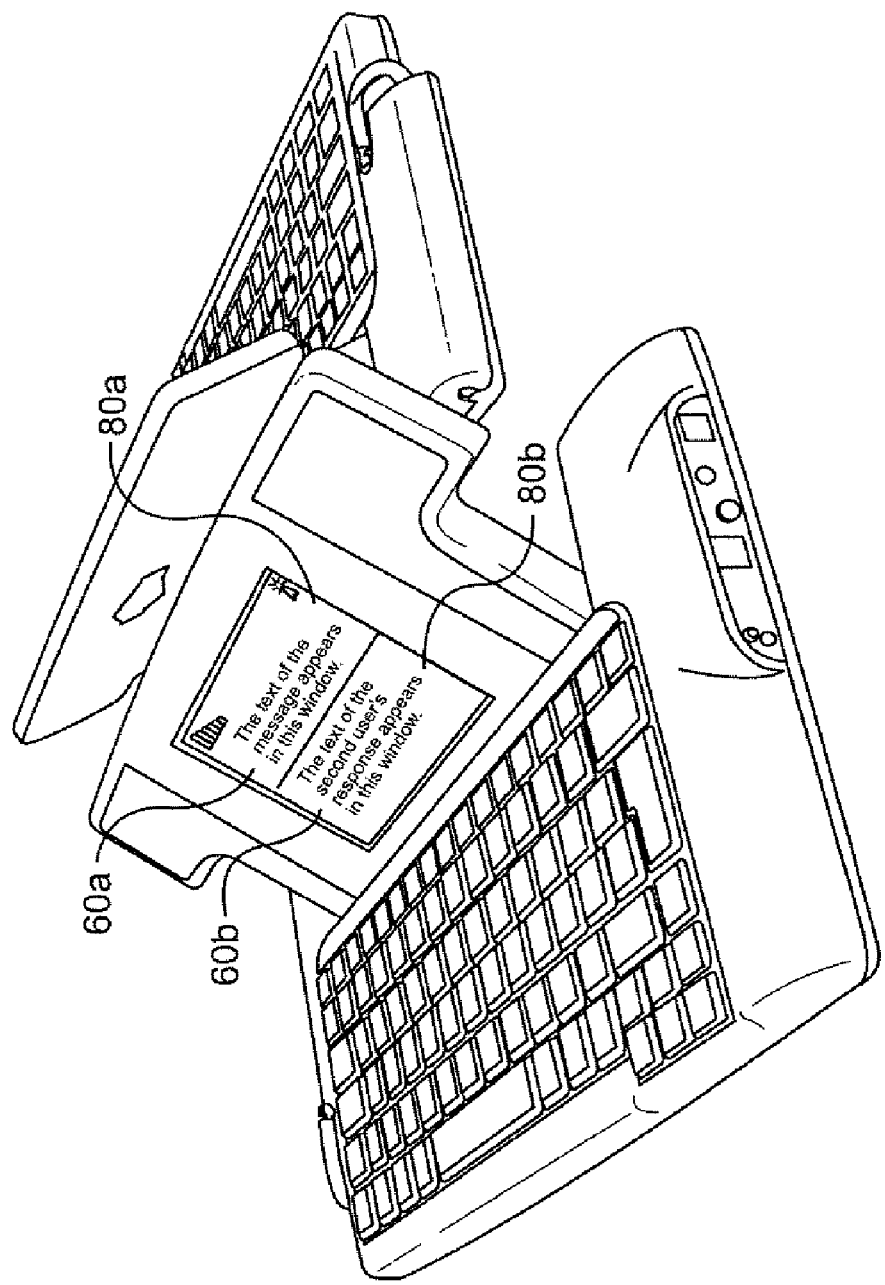

FIGS. 1A and 1B depict an embodiment of the full view of the interactive speech communicator system 10. The interactive speech communicator system 10 comprises first 20 and second 30 keyboards, first 40 and second 50 (not visible) display screens, which comprise one or more dialogue boxes 60a, 60b (illustrated in FIG. 1B) and one or more shortcut keys, sign language characters, language selection buttons and a foreign language symbols 70. Shortcut keys 401, 403, 405, 407, 409, 411, special characters, language selection buttons, and foreign language symbols are further illustrated in FIG. 1C. Optionally, additional input-output (I/O) devices may be used. For example, external keyboards (not shown) including one-handed keyboards and other specialty keyboards may be connected to the interactive speech communicator system 10 to serve as input means, while Braille writing devices (not shown) may be connected to the interactive speech communicator system 10 to serve as input or output means. Additional output devices such as video monitors may also be connected locally or remotely to the interactive speech communicator system 10 to enable additional viewers to read entered text and to participate in the dialogue sessions. For example, one communicant may be conducting a dialogue session with a second communicant, and an observer may wish to view the dialogue. Rather than look over the shoulder of a communicant to read the text of the displayed dialogue, the observer may utilize an additional external video monitor to display the text from the first communicant's display. In this fashion, the observer may view the dialogue in an unobtrusive fashion, such as during a conference call or during a multi-communicant dialogue. Additionally, the interactive speech communicator system 10 may include further options such as video conferencing hardware and software to provide video communication means for communicants as well. Similarly, these I/O devices may be integral to the interactive speech communicator device or may connect externally through separate I/O ports.

An advantage of the interactive speech communicator system is shown in its size and portability. In one embodiment, the following dimensions can be realized: the screen portion can be 4 inches tall and the keyboard 4 inches deep with a 5 inch height and an 8 inch width. Each dialogue screen can be at least 4 inches wide. From the edge of one keyboard to the edge of the second keyboard, the total open width can be 8 inches. However, these dimensions are only illustrative and similar dimensions, which emphasize portability and comfort can be utilized.

Additionally, the interactive speech communicator system utilizes an on-board rechargeable battery to enable mobile operation. As well, the interactive speech communicator system may be powered by a standard electrical convenience outlet. A number of I/O ports are also present, for example USB ports, fire wire ports, as well as serial and parallel data and audio and visual ports. A modem for telephone access and data transmission is also provided as is an Ethernet or similar I/O device to access networked computers, such as the Internet, via standard communication cables and protocols.

Figure 2:
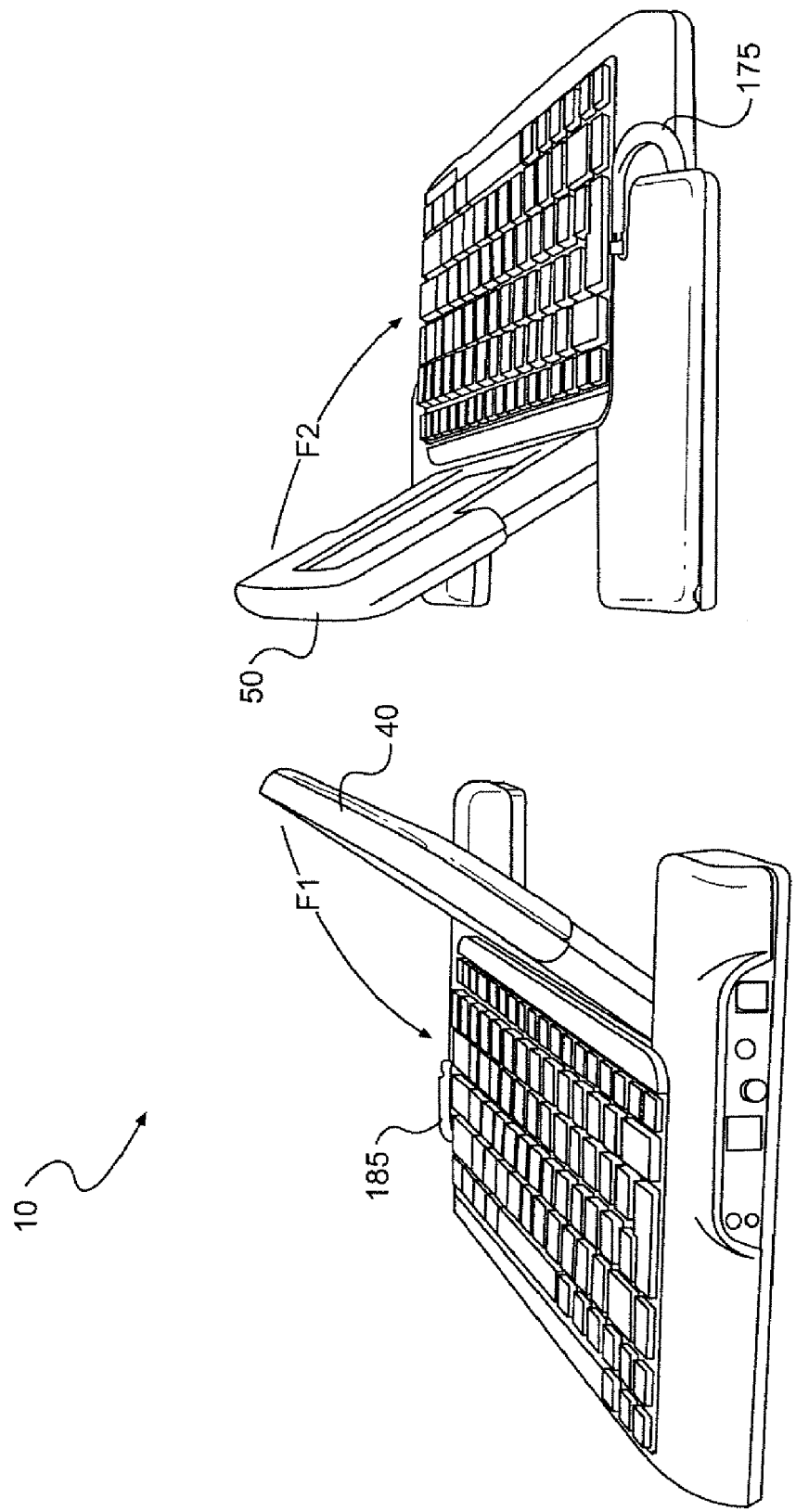
FIG. 2 illustrates an interactive speech communicator communication system as two communication devices in a partially open view.

FIG. 2 illustrates an embodiment of the interactive speech communicator system 10 by showing the manner in which the interactive speech communicator device may be folded for storage and transportation. The interactive speech communicator system 10 is easily stored and carried. Each of the display screens 40, 50 may be folded along arrows F1, F2, respectively, to close the respective devices. Once each of the respective devices is closed, one of the devices may be flipped vertically (so that the folded display screens are facing each other). The respective devices may then be joined together using attachment mechanisms 175, 185 to secure each side. A handle assembly (not shown) can also be combined with this configuration.

Figure 3B:
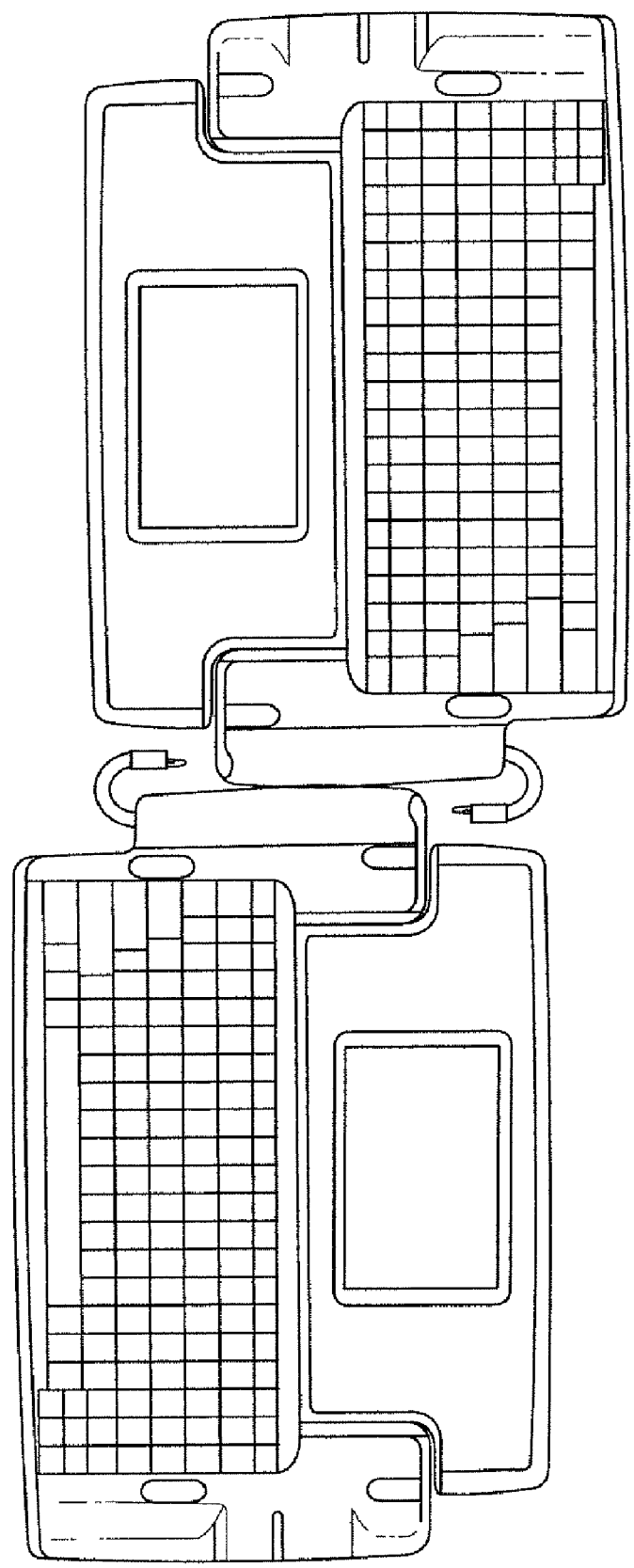
Figure 3C:
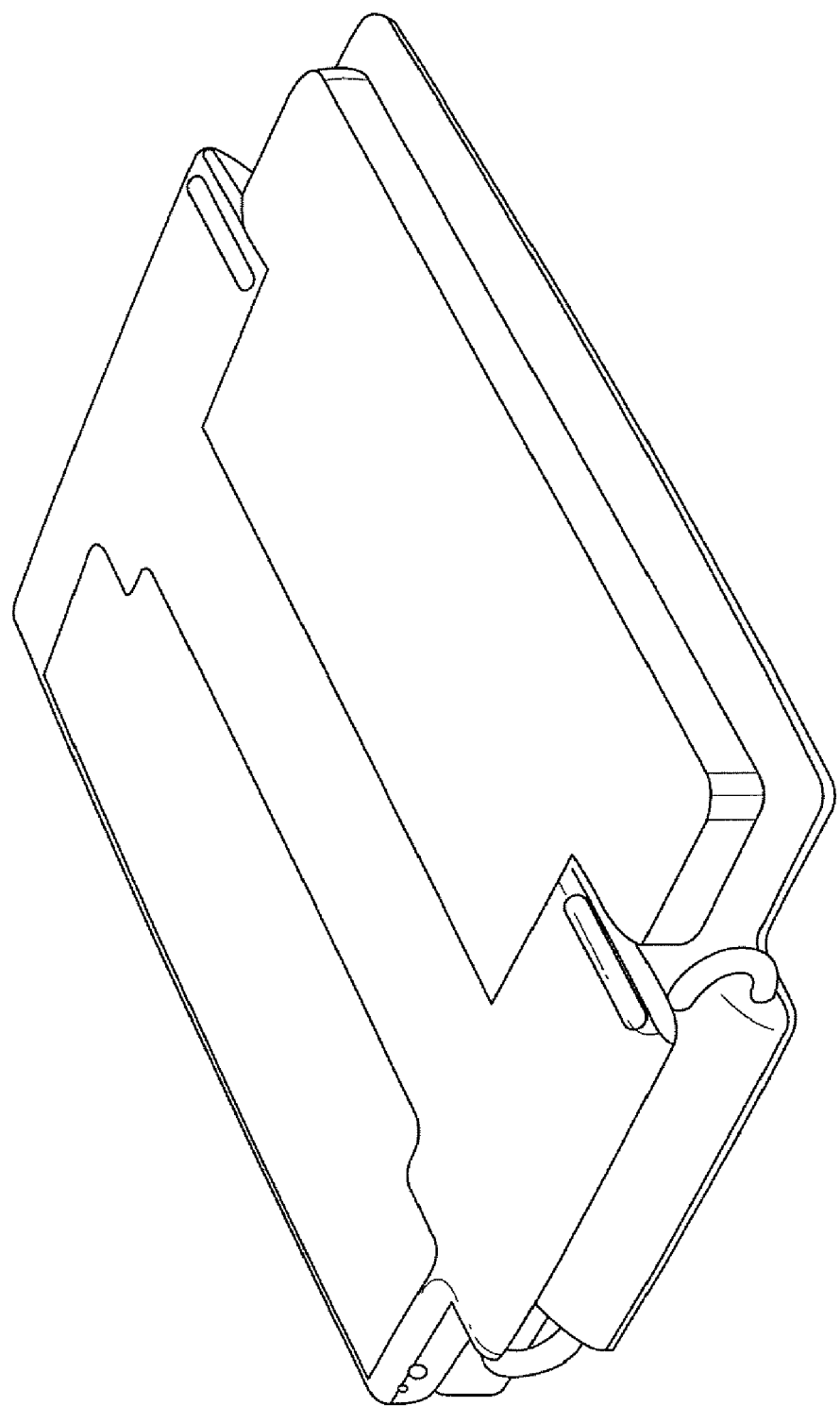

FIG. 3A illustrates an embodiment of the interactive speech communicator 10 system in a joined configuration. In FIG. 3A, two interactive speech communicator devices are joined using attachment mechanisms 175, 185. FIG. 3B illustrates two interactive speech communicator devices un-joined. As illustrated in FIGS. 3A-3C, the interactive speech communication system 10 is capable of being joined and folded into a compact configuration resembling a closed laptop computer. The system 10 in the joined and folded configuration is shown in FIG. 3C. In the joined and folded configuration, the interactive speech communicator system 10 is compact, self-contained, and allows for easy storage within a briefcase, backpack, medium size purse, and the like, for ease of transport and storage.

Referring again to FIG. 1B, an embodiment of one perspective of the interactive speech communicator system 10 which is viewed by one communicant seeing both conversations simultaneously in dialogue boxes 60a, 60b. Each communicant is able to view both dialogue boxes 60a, 60b and see the messages 80a, 80b as they are typed by each user. Optionally, one communicant's device may relay the messages in English while the other communicant's device may relay the same message in another language, such as Spanish. This allows both communicants to have a conversation even if they speak different languages.

Each communicant will select a display configuration before initiating the dialogue. The dialogue boxes 60a, 60b shown in FIG. 1B can be configured in a side-by-side configuration, a top and bottom configuration, or alternating user configuration. In an example shown in FIG. 1B, the top and bottom dual screen configuration is shown. Any screen configuration that serves to enhance the dialogue between the two communicants is within the scope of this invention.

Figure 6:
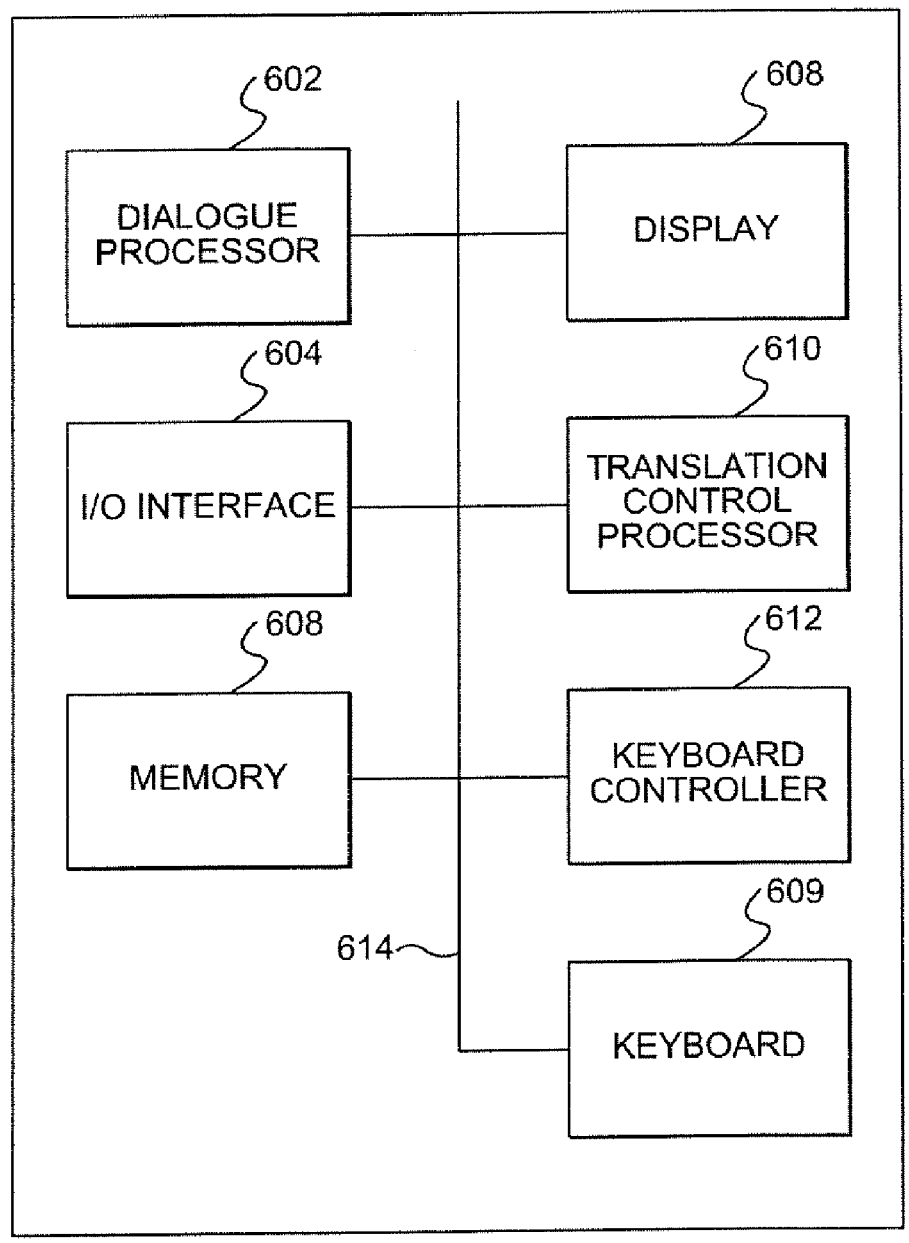
FIG. 6 is a block diagram illustrating an interactive speech communicator device in accordance with systems and methods of the invention.

FIG. 6 schematically illustrates an interactive conversational interactive speech communicator device 10 in accordance with the systems and methods of the invention. The interactive speech communicator device 10 includes a dialogue processor 602, an I/O interface 604, a memory 606, a display 608, a keyboard 609, a translation control processor 610, and a keyboard controller 612. While FIG. 6 shows the dialogue processor 602, the translation control processor 610, and the keyboard controller 612 as separate units, the functions performed by these units may be combined or may be further divided among specified processors such as digital signal processors and/or performed by dedicated hardware such as application specific integrated circuits (ASIC) or other hardware implementations integrated into existing translators, for example. While FIG. 6 shows a bus architecture, other hardware configurations may also be possible.

Also, while one embodiment may utilize a wireless transceiver as the I/O interface 604, similar means of transmitting data from a first communicant to a second communicant may also be employed, for example a hard-wired connection when a wireless connection is not permitted or is otherwise not desired, a telephone line, a T1 connection, an Internet connection, and the like. The above components are coupled together through a control/signal bus 614.

Further, the processors used in the interactive speech communicator system 10 need not be a single contiguous entity. Instead, the processors 602, 610 and 612 can be implemented, at least in part, as a plurality of general purpose data processors and/or as a single special purpose integrated circuit (e.g., ASIC) or an array of ASICs each having a main or central processor section for overall system-level control, and separate sections dedicated to performing various specific computations, functions and other processes under the control of the central processor section. According to the invention, a particular function of the processor 610 is to perform real-time or near real-time communication and display for text-based conversations. An optional speech synthesizer (not shown) can also be incorporated into the present invention giving an artificial voice to communicants who cannot speak.

A communicant uses keyboard 609 to at least input commands and other instructions to the interactive speech communicator system 10. The keyboard controller 612 is used at least to detect and recognize input commands, including special character keys, from the keyboard and relay this information to the dialogue processor 602. The dialogue processor 602 operates to at least process incoming and outgoing textual messages in accordance with the invention so that real-time conversations can be implemented.

The present invention may be utilized in a number of different modes and with a number of different features depending upon the communication environment, the number and type of the users communicating, and the proximity in which the users communicate.

Split-Mode

For example, the present invention may be used in a split mode where simultaneous face-to-face communication takes place between two communicants. In the split mode, as a first communicant types a message in one dialogue window for example, the top window 60a as shown in FIG. 1B), a second communicant may be simultaneously entering a message in the bottom window. The display screen is split between the two communicants, and each communicant may view the other communicant's message in their corresponding dialogue box as it is entered. In the split mode, if a deaf person is communicating with a person who can hear, the deaf person may be typing in the same language as the person who can hear, and no additional translation step would be required. Alternatively, the keyboard input may be removed in favor of a speech synthesizer or other means of converting speech to text and vice versa. Users may view both their own input in one dialogue window and the input of the other user in a second dialogue window, where the display is split by the multiple dialogue boxes. The split mode of operation may be used when the two communicants are physically close to each other or are located in different physical locations. However, the number of communicants is not limited to two users, but rather, additional communicants may also participate in the conversation by connecting to the discussion at the same time. For example, four communicants may conduct a discussion where the split mode display screens of each communicant display each communicant's typed text on each of the participating communicants' display screens.

One communicant may initiate a dialogue and select the SPLIT icon 401 illustrated in FIG. 1C. By activating this icon, the first communicant may start a dialogue session in the split screen mode. If the designated dialogue partner is not on the interactive speech communication network, the first communicant may open the IN RANGE icon 405 to display all available communicants within communication range of the interactive speech communicator device of the first communicant. The first communicant may use arrow keys Arrow keys (not shown) to move through a list of potential communicants that are within range of the interactive speech communication network. If the first communicant locates a potential communicant with whom the first communicant would like to communicate, the first communicant may hit the <Enter> key or otherwise select the potential communicant.

Similarly, if two communicants are conducting a dialogue using the interactive speech communicator devices, a communicant may select the IN RANGE icon 405 at any time during the session and add additional communicants to the dialogue displayed in the split screen session. When additional communicants are added, the interactive speech communicator display screen will repartition into the appropriate number of split sections according to the number of communicants participating in the dialogue. Also, other interactive speech communicants can request additional dialogue sessions in the same manner as the first communicant.

Optionally, one communicant may be typing in English, while a second communicant enters his message in Spanish, or another foreign language, for example. The English may be translated before it is sent and displayed to the second communicant. Similarly, as the second communicant types in Spanish, the Spanish message is translated into English before it is sent and displayed in the first communicant's display dialogue window.

Thread Mode

Figure 4:
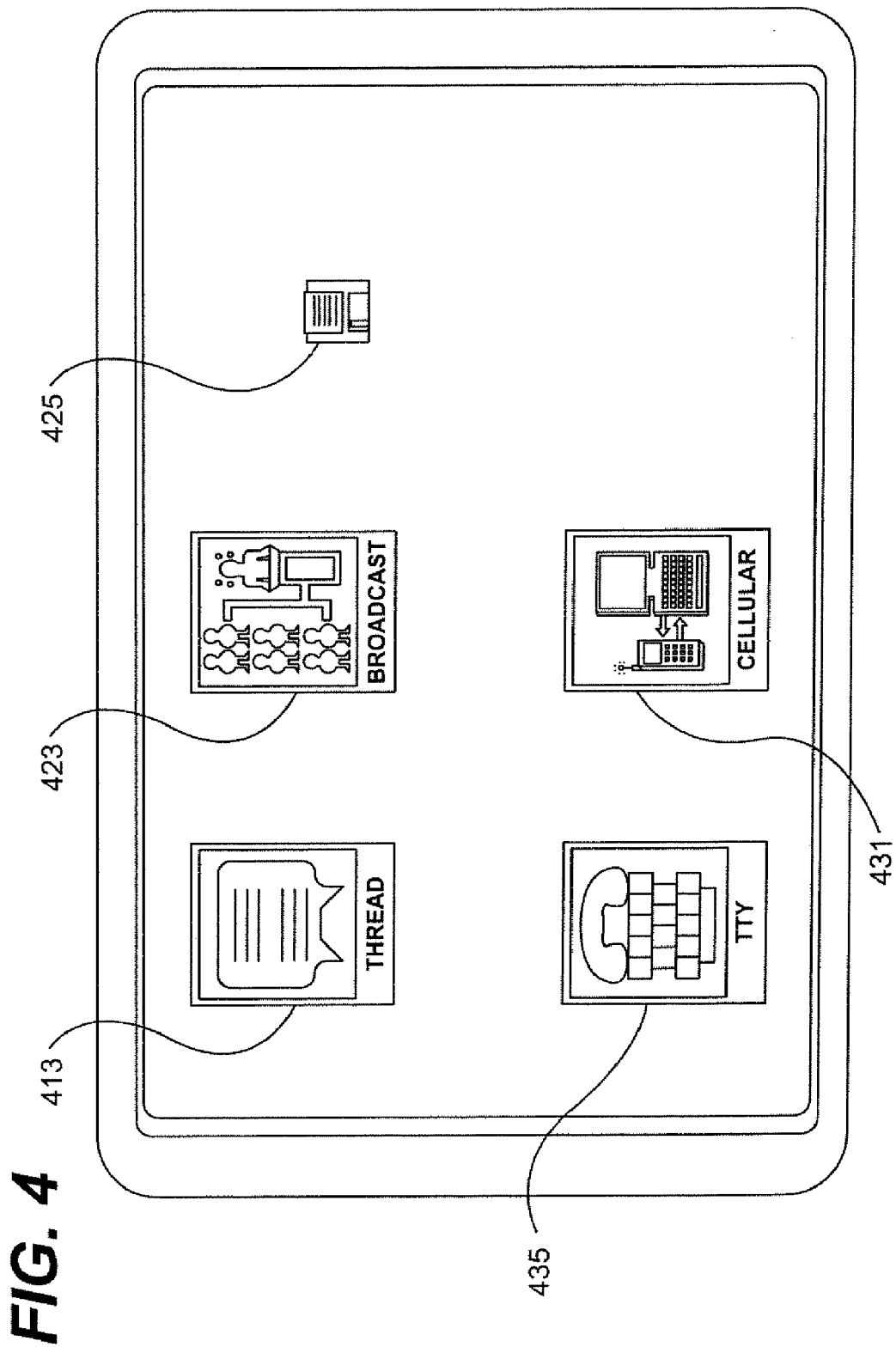
FIG. 4 illustrates a display of an interactive speech communication device showing a variety of mode icons with which the interactive speech communication device may be configured and used.

As also illustrated n FIG. 4, a communicant may actuate a <THREAD> icon 413 to initiate a dialogue in the Thread mode. The Thread mode allows communicants to take turns sending messages back and forth, and each transmission and reception of a message may be posted sequentially similar to an instant messaging format. Similarly, if two communicants are conducting a dialogue using the interactive speech communicator devices in the thread mode, a communicant may select the IN RANGE icon 405 at any time during the session and add additional communicants to the dialogue. The interactive speech communicator device will then display a new thread for the newly added participant. Likewise, the interactive speech communicator device will add or subtract threads according to the number of dialogue communicants are participating at any given time. Also, other interactive speech communicants can request additional dialogue session threads in the same manner as the first communicant.

Cellular Mode

As illustrated in FIG. 4, in the cellular mode, the communication device may be used to connect any BlackBerry™, cell phone, portable digital assistant, and other similar communication device using a cellular, satellite, or other mobile communication protocol or format. A communicant may actuate a <CELLULAR> icon 431 to initiate an electronic connection between an interactive speech communicator device and a connected cellular device. The cellular mode allows a first communicant to connect the interactive speech communicator device to the cellular device using the cellular device's headset jack or other input/output connection. The first communicant dials the number of a second communicant using the cellular device's phone book, keypad, or other input device. Once the call connection is made to a second communicant's location, the second communicant may connect their cellular or other telephonic device to a TTY or an interactive speech communicator or other interface at the second communicant's location. The interactive speech communicator device interrogates the second communicant's device (such as another interactive speech communicator, TTY, cellular phone, land-based phone, and the like) and determines the manner of communication that is possible. For example, if the second communicant is using another interactive speech communicator device, a dialogue screen appears on both devices, and the communicants can conduct a dialogue session as if they were in the same physical location. Similarly, if the second communicant's device is a TTY, the first communicant's device will open a TTY dialogue screen and conduct the dialogue session using TTY protocols. Once the cellular dialogue session is complete, the interactive speech communicator device will return to normal operation.

TTY Mode

As illustrated in FIG. 4, in TTY mode, a user may access and communicate with a TTY user as outlined above with regard to the Cellular mode. If a first communicant is calling a TTY device via a phone line, the interactive speech communicator device will utilize a modem as the communication channel for the phone line. A first communicant selects the TTY icon 435, and the interactive speech communicator device opens a portion of the screen where the first communicant may enter a telephone number or select a telephone number from a set of stored telephone numbers. If the first communicant wishes to call a new number, the first communicant types the number into an entry box on the display. If the first communicant wishes to call a stored number, the stored numbers may be selected from the display as well. The <TAB> or arrow keys may be used to permit the first communicant to step through the list of stored numbers.

When a second communicant answers the call on the other end, the interactive speech communicator device will interrogate the second communicant's device to determine the type of communication available and the appropriate communication protocol. As indicated above, if a second interactive speech communicator device is the second communicant's device, both interactive speech communicator devices will transition to a dialogue screen where the interactive speech communicator devices allow the communicants to conduct a dialogue using the interactive speech communicator interfaces. Similarly, if a TTY device is present at the second communicant's location, the interactive speech communicator device at the first communicant's location will conduct the communication session using TTY protocols.

Broadcast Mode

In the broadcast mode, an unlimited number of communicator devices may be used to receive text from a transmitting communicator device. For example, as shown in FIG. 4, a presenter at a conference may select the <BROADCAST> icon 423 to transmit his presentation or the presenter may type his comments into the transmitting interactive speech communicator device to broadcast his presentation and messages to his audience. The audience may be comprised of an unlimited number of people using communicator devices to receive the presenter's program or the presenter's transmitted text. In this mode, each recipient receives the same presentation or text that is being transmitted by the presenter.

Figure 5A:
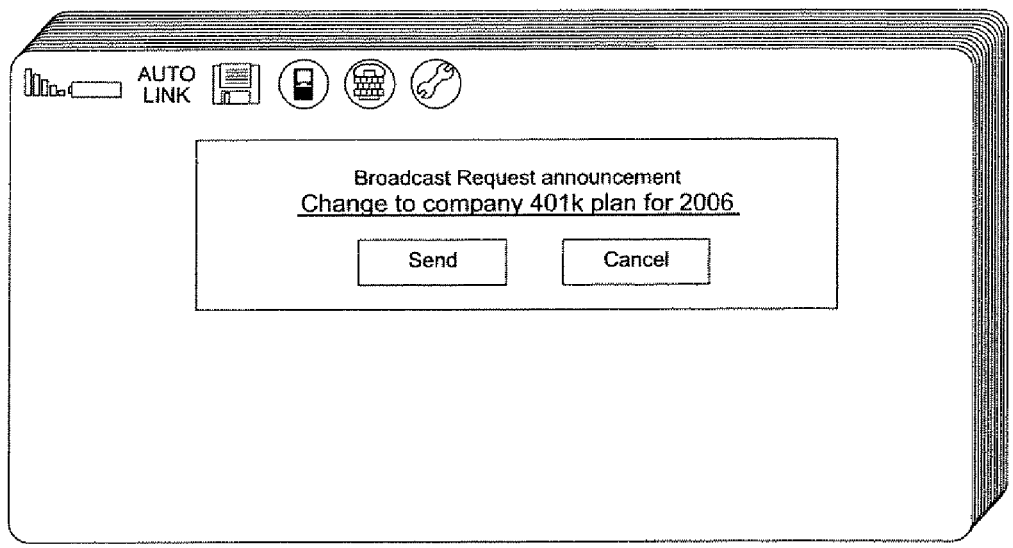
FIGS. 5A-5B illustrate a use case example of the interactive speech communicator system used in Broadcast Mode.
Figure 5A:
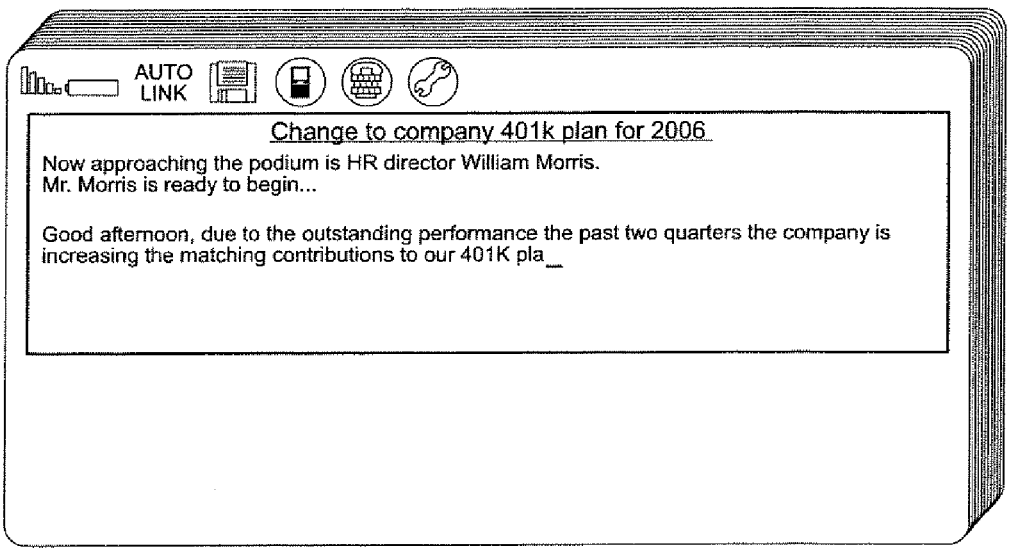

The presenter may actuate the <BROADCAST> icon 423. The interactive speech communicator device prompts the presenter to enter a descriptive title for the broadcast content. An example may be in a corporate setting such as that depicted in FIG. 5A, where a presenter enters, "Changes to Company 401k Plan for 2006." When the presenter enters the descriptive title and submits it, the interactive speech communicator device sends out a broadcast request message. Other communicants will see a display section pop up with the descriptive title "Changes to Company 401k Plan for 2006" inviting them to receive the broadcast message. When a communicant accepts the broadcast request, a display section opens into which the broadcast content is streamed. Further, the interactive speech communicator device used by the presenter periodically re-sends the broadcast request throughout the presentation session to accommodate other communicants coming into range of the broadcast transmission after the initial request was sent.

Figure 5B:
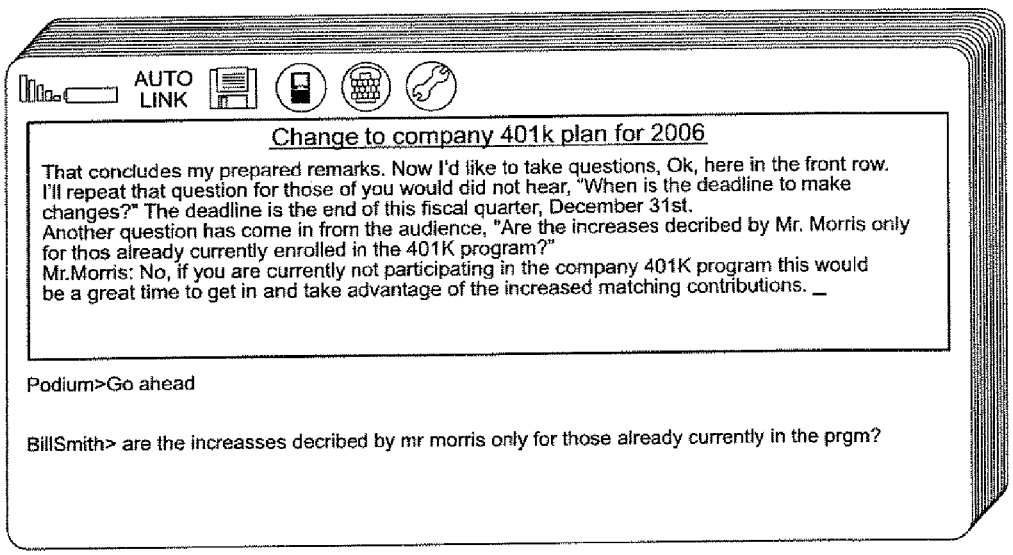

Also, as shown in FIG. 5B, in the broadcast mode, a broadcast recipient may ask a question of the presenter by typing text into the recipient's interactive speech communicator device, whereupon the question text is transmitted to the presenter only (rather than to each of the recipients). Alternatively, the text of the question may be transmitted to a moderator, who may then compile questions format the questions, and provide them to the presenter. Also, a presenter may finish their presentation, ask for questions from the audience, select the question(s) they wish to address, and then communicate the question and response to all of the audience.

Audience Mode

Figure 8B:
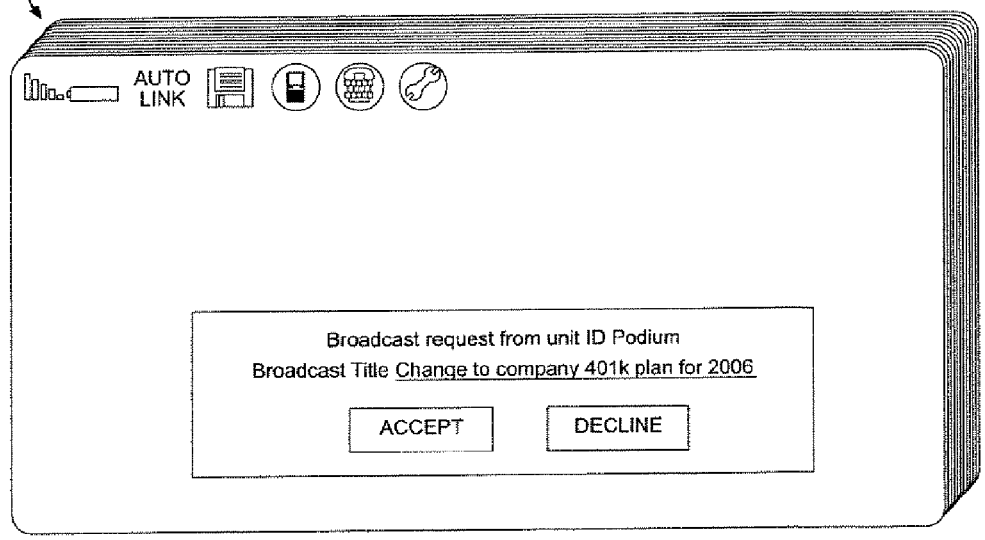
Figure 8B:
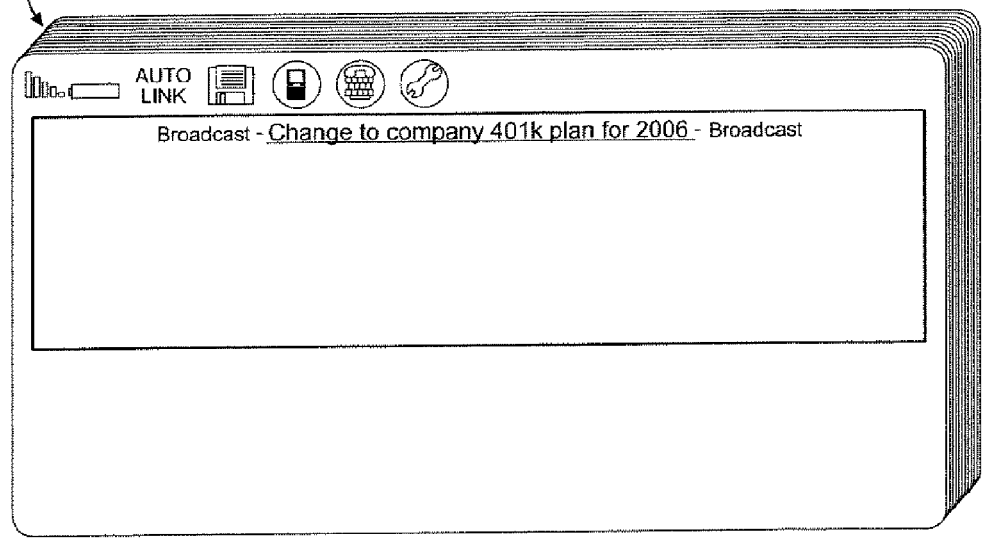
Figure 8C:
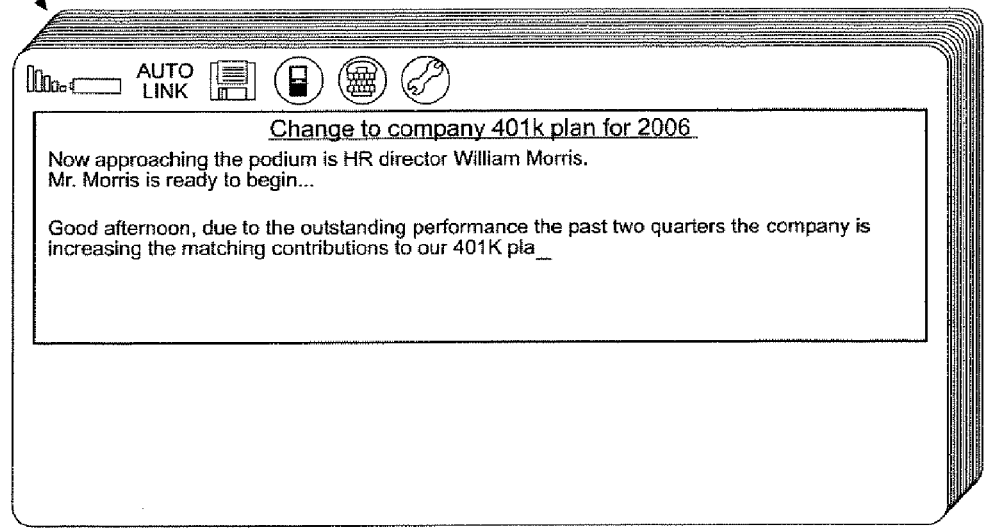
Figure 8C:
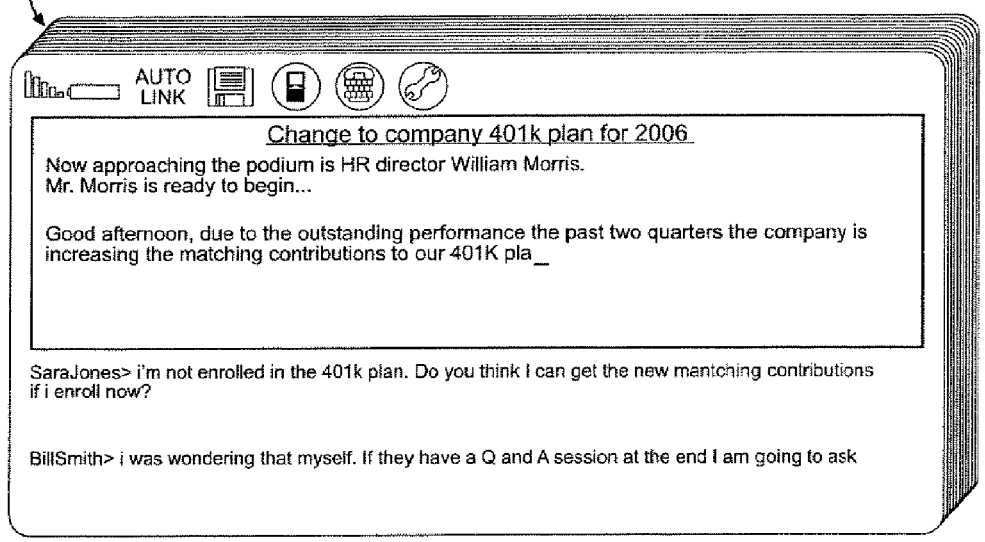

As shown in FIG. 8A, Audience mode is used in conjunction with the Broadcast mode described above. FIG. 8A shows the scenario where a presenter 811 at a podium is in Broadcast mode and sends out a request 817 for the broadcast entitled "Change to Company 4011k Plan for 2006." The interactive speech communicator device communicants in the audience, such as the device communicant with the ID of Sara Jones 813, accepts the request for Broadcast 821 (shown in FIG. 8B) and the screen display changes to acknowledge receipt of the presentation 823. Similarly, returning to FIG. 8A, the device communicant with the ID of Bill Smith 815 also accepts the broadcast. The interactive speech communication device may be switched to other modes in addition to receiving a broadcast stream of information. A moderator or typist may provide transcription of the presentation 851 as shown in FIG. 8C, or otherwise relay the spoken word presentation as illustrated in FIG. 8C. Audience members may communicate with one another during a presentation as depicted in the screen display 853, or may communicate with another user outside of the broadcast audience at the same time that the broadcast is being transmitted and received in a different window. Communicants may determine other interactive speech communicator devices within range, select an unit ID or other manner of identifying the interactive speech communicator devices within range, request a dialogue session with one or more devices in the range, and begin relaying questions and comments to one another regarding the presentation or other issues.

Group Mode

In the group mode, a communication session may be polled by a new user. The first communicants may then grant access to the new user by adding them to the communication session. For example, if USER1 and USER2 are communicating, and USER3 wishes to join the communication session, USER3 may request access to the session. USER1 may then grant USER3 access to the session, and USER3 may then post her comments to the session as well. This may be expanded to an unlimited group of users in a similar fashion. The communications modes used by the first users may then be enabled on the new users' interactive speech communicator device. For example, a split screen showing all group participants may appear upon granting access, or a thread mode screen may appear after access is granted depending upon the manner in which the original users initiated the communication session.

Audio Link

The interactive speech communication device includes an audio connection, which enables connection to a telephone or other audio communication medium. The audio link may be used to simultaneously communicate a text message and an audio message. For example, the transcription of a court proceeding may be transmitted by an interactive speech communicator system to other interactive speech communicator users. Additionally, using the audio link feature, a court reporter may be listening in one location and typing a transcription of the audio conversation, such as an oral argument taking place in a court room. The court reporter is transmitting the transcription of the oral argument to a second interactive speech communication device user. The transcription will then appear on the display of the second user's interactive speech communicator device. If the second user then has a question, or wishes to otherwise interrupt the proceedings, the second user may type in their question, transmit it back to the court reporter who would then interrupt the proceedings by verbalizing the second user's question.

Alternatively, a court reporter may listen to the proceedings by telephone in a remote location and transcribe the proceedings for a participant in the court where the arguments are taking place or at a separate location. For example, if the opposing party is presenting their oral argument, a court reporter may transcribe the opposing party's arguments and transmit the text of the argument to the text-reading party. The text-reading party may then review the opposing side's arguments and interject at appropriate times by relying upon the text transmitted by the remote court reporter. Both text-to-speech capabilities and speech-to-text capabilities are provided in all modes of the interactive speech communication device of the present invention.

For example, in an educational environment, the audio link feature of the interactive speech communication device may provide the opportunity for students in a remote location to receive the text of a lecture as a teacher is speaking in a classroom. The reporter may type what the teacher is saying, and the text will appear on the screen of the remote student's interactive speech communication device. The device has a microphone and speaker attachment so that when the student wants to ask a question, the reporter can take the student's text-based question and verbalize the question, and the class will hear.

Similarly, the audio link feature may be used in the opposite fashion in a classroom environment. For example, the reporter may be located in a remote location, listen in to what the teacher is saying via the audio link, convert the teacher's verbal presentation to a text-based message, and transmit the text-based message back to students in the classroom.

In-Range

As shown in FIG. 4, an in-range icon 405 is used for the interactive speech communicator device to initiate a wireless connection to poll other wireless devices within a predetermined local range, such as one-quarter mile. If a second interactive speech communicator device answers the poll, a user carrying the interactive speech communicator device is notified. Similarly, the interactive speech communicator device may relay the in-range notification to another device, such as a vibrating pager or other portable communication devices. For example, a user carries the interactive speech communicator device across a college campus in between classes. The interactive speech communicator device sends out a signal that may be received by other interactive speech communicator devices. When the transmission from the first interactive speech communicator device is picked up by the second device, both users are notified that there is another interactive speech communicator user in the near geographic area, and the two users may choose to communicate with each other using one of the communication modes above. Likewise, a wired connection may also be used to poll networked devices that were previously connected or previously participated in a dialogue. For example, wired devices with permanent or semi-permanent IP addresses may be polled to inquire as to whether the communicants using these addresses wish to participate in a discussion. The interactive communication device of the present invention includes the capability to solicit communicants to participate in discussions in this fashion as well as the more portable wireless manner.

Auto-Link

As illustrated in FIG. 4, a first communicant may toggle the auto-link icon 407 from OFF to ON to automatically open a new communication session if no session is in progress, or to be added to a communication session that is already in progress. If the Auto-link feature is turned off, the first communicant will see a window indicating that a second communicant is requesting a communication session. The first communicant may then accept or reject the request for a communication session. When the Auto-link feature is turned on, the first communicant will not see a new window indicating that a second communicant is requesting a communication session. Instead, if a communication session is not in progress, a new dialogue window will open without any action required by the first communicant. If a dialogue session is in progress, the second communicant will be added to the dialogue session without any action required by the first communicant.

Settings

A communicant may activate the settings icon 409 to access the system configuration parameters and setup variables. The default setup icons may also be accessed by using the setting icon 409.

Saved

A communicant may activate the saved icon 411 to open a window displaying all log files stored on the interactive speech communication device. The communicant may select files from the list and thereby open the file in a display window on the interactive speech communicator device.

File Save

A communicant may save a current communication session to a log file on the interactive speech communicator system by activating this file save icon 425. The communication session is then stored to a log file on the system, which can be extracted onto another computing device to be copied, formatted, edited, sent as an email, printed, manipulated as a computer file, and the like.

Example

In an example of utilizing the invention, a text-based conversation initiated between two deaf users can be accomplished by the first user typing in the text message, and the message is sent to the opposing display of the second user. When the second user responds and types in a reply message, the reply message would be received by the first user's device and displayed. The received text message will appear in one window of the user display while in a separate display window, the user types their own message to send. Various combinations of language translation can be utilized by this invention. Similarly, the translation may be performed in the sender's device prior to sending the message, or upon receipt of the message by the recipient user's device.

Figure 7:
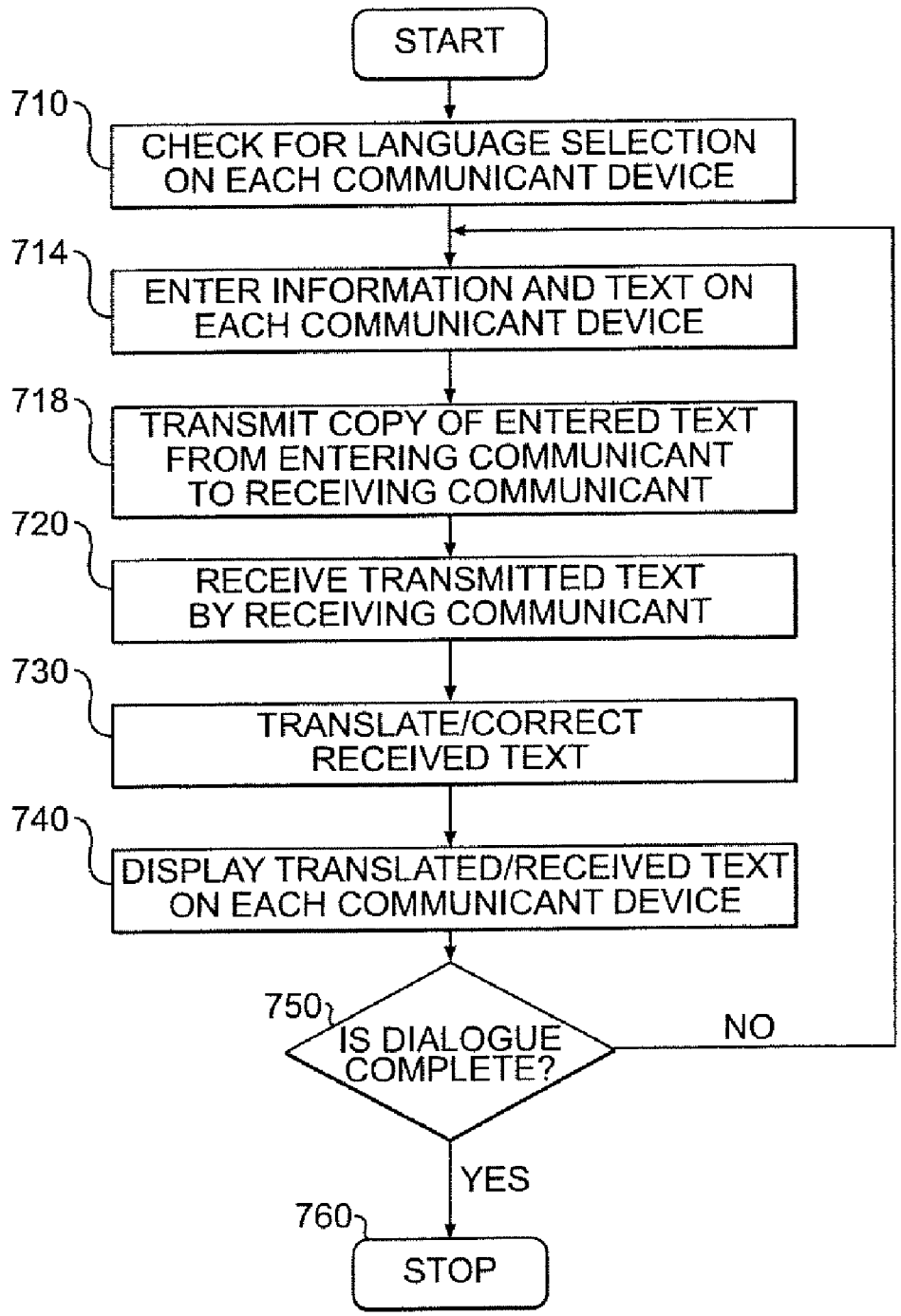
FIG. 7 is a flowchart illustrating an embodiment of a method for two-way conversation without an human translator in accordance with systems and methods of the invention.

As further illustrated in the accompanying flow diagram of FIG. 7, in operation, a first user (not shown) selects a language, and in step 710, the method of the present invention checks for the language selection. If a user does not manually select a language, the system defaults to English language. In step 714, the first user, via a first keyboard 20, enters a text-based message. In step 718, the text-based message is translated, if needed, and the message is then sent by first wireless transceiver 55 to second keyboard 30. The text-based message is received by second wireless transceiver 65 in step 720 and processed. Processing may include translating the received message from one language to another in step 730, or may include other text and display formatting steps such as selecting fonts, selecting screen colors, converting received text to displayed text, and other processing.

In step 740, the processed message is then displayed on the second screen portion 50 in a dialogue box (not shown) similar to the dialogue boxes 60a, 60b shown in FIG. 1B. If the dialog is complete in step 750, the process stops in step 760. If the communicants wish to exchange additional messages, the second communicant can then respond to the first user by typing a message using the second keyboard 30, and the process continues again in step 714. This message is translated, if necessary, and then transmitted and displayed on the first screen portion 40 via dialogue box 60b. Similarly, the original message may be transmitted first to a second keyboard and then translated by the second keyboard as well. This order of transmission and translation, if necessary, can facilitate simultaneous translation of an original message to more than one message recipient, such as when the first user is broadcasting his message to multiple user recipients.

The disclosed method may be readily implemented in software using object or object-oriented software development environments that provide portable source code that can be used on a variety of computer hardware platforms. Alternatively, the disclosed interactive speech communicator operations may be implemented partially or fully in a hardware using standard logic circuits or VLSI designs. Whether software or hardware is used to implement the systems in accordance with this invention is dependent on the speed and/or efficiency requirements of the system, the particular function, and the particular software or hardware systems or microprocessors or microcomputer systems being utilized.

The invention has been described with particularity in connection with the embodiments. However, many alternates, modifications and variations may be made to the embodiments of the invention without departing from the spirit and inventive concepts contained herein. Accordingly, the present invention is intended to embrace all such alternatives, modifications, and variations.

What is claimed is:

1. A method for providing text-based dialogue between communicants in a portable environment, the method comprising:

selecting a first dialogue language for a first communicant using a first text-based input communication device;

selecting a second dialogue language for a second communicant using a second text-based input communication device;

entering text-based communication data from the first communicant using the first text-based input communication device in the first dialogue language, wherein the text-based communication data from the first communicant is displayed on a first communicant display;

entering text-based communication data from the second communicant using the second text-based input communication device in the second dialogue language, wherein the text-based communication data from the second communicant is displayed on a second communicant display;

transmitting a copy of the text-based communication data from the first communicant to the second communicant while the text-based communication data is entered by the first communicant;

receiving the text-based communication data from the first communicant by the second communicant;

transmitting a copy of the text-based communication data from the second communicant to the first communicant while the text-based communication data is entered by the second communicant;

receiving the text-based communication data from the second communicant by the first communicant;

displaying the received text-based communication data from the first communicant on the second communicant display; and displaying the received text-based communication data from the second communicant on the first communicant display, wherein the first text-based input communication device and the first communicant display are comprised in a first communicant system, and wherein the second text-based input communication device and the second communicant display are comprised in a second communicant system separate from the first communicant system.

2. The method for providing text-based dialogue of claim 1,
wherein the first and second communicant systems are each foldable into a first and second position,
wherein the first and second communicant displays are erected upright in the first position, and
wherein the first and second communicant displays oppose the first and second text-based input communication devices, respectively, in the second position.

3. The method for providing text-based dialogue of claim 1, wherein the steps of displaying the received text-based communication data from the first communicant and from the second communicant occur in substantially real-time.

4. The method for providing text-based dialogue of claim 1, further comprising translating the received text-based communication data from the first communicant and from the second communicant into the receiving communicant's selected dialogue language prior to being displayed.

5. The method for providing text-based dialogue of claim 1, wherein the steps of displaying the text-based communication data from the first communicant and displaying the text-based communication data from the second communicant include displaying the text-based communication data text in dialogue boxes arranged in a split side-by-side or a split top-bottom configuration on the first communicant display and on the second communicant display.

6. The method for providing text-based dialogue of claim 5, wherein the dialogue boxes arranged in a split side-by-side or a split top-bottom configuration display the text-based communication data from the first communicant and the text-based communication data from the second communicant simultaneously as the text-based communication data from the communicants is entered being transmitted.

7. The method for providing text-based dialogue of claim 1, further comprising converting spoken language to the entered text-based communication data from the first communicant.

8. The method for providing text-based dialogue of claim 1, further comprising:
sending an in-range polling signal seeking a potential communicant with whom to conduct the text-based dialogue; and
receiving the in-range polling signal and answering the in-range polling signal by providing identification of the potential communicant to a sender of the in-range polling signal.

9. The method for providing text-based dialogue of claim 1, further comprising:
initiating an electronic connection between the text-based input communication device using a telephonic communication protocol; and
connecting a telephonic input communication device to the electronic connection to establish communication between the text-based input communication device and the telephonic input communication device with which to conduct the text-based dialogue.

10. The method for providing text-based dialogue of claim 1, further comprising connecting the text-based input communication device to simultaneously communicate text-based communication data and audio data.

11. The method for providing text-based dialogue of claim 1, further comprising adding additional communicants to the text-based dialogue by:

selecting an additional dialogue language for each of the additional communicants using an additional text-based input communication device for each additional communicant;
entering and displaying text-based communication data from each of the additional communicants using the additional text-based input communication devices in the additional dialogue languages, wherein the text-based communication data from each of the additional communicants is displayed on each communicant's display;
transmitting copies of the text-based communication data from each of the communicants to all communicants;
receiving the text-based communication data from each of the communicants by all communicants; and
displaying the received text-based communication data from each of the communicants on all communicant displays.

12. The method for providing text-based dialogue of claim 11, further comprising:
entering and transmitting a descriptive title of broadcast content prepared by the first communicant characterizing the text-based communication data of the first communicant to solicit communicants who wish to receive the text-based communication data of the first communicant;
receiving the transmitted descriptive title and indicating acceptance of the solicited broadcast content;
broadcasting copies of the text-based communication data from the first communicant to the accepting communicants; and
receiving copies of the text-based communication data by the accepting communicants.

13. The method for providing text-based dialogue of claim 12, further comprising:
submitting text-based communication data by an accepting communicant to a moderator;
compiling and formatting the submitted text-based communication data by the moderator; and
presenting the text-based communication data to the first communicant.

14. A system for providing text-based dialogue between communicants in a portable environment, the system comprising:
first and second I/O interfaces for selecting a dialogue language for first and second communicants, the first and second I/O interfaces including first and second input devices, respectively, connected to allow the first and second communicants to input text-based data;
a dialogue processor for receiving the inputted text-based data in the selected dialogue language from the communicants while the text-based data is being input by the communicants;
a first display screen for displaying text-based data entered by a first communicant;
a translation control processor for translating the received inputted text-based data from the first communicant to a second communicant's selected dialogue language for display to the second communicant; and
a second display screen for displaying the translated text-based data to the second communicant in the selected dialogue language,
wherein the first input device and the first display screen are comprised in a first communicant system;
wherein the second input device and the second display screen are comprised in a second communicant system separate from the first communicant system;

wherein the first and second communicant systems are each foldable into a first and second position, wherein the first and second display screens are erected substantially upright in the first position, and wherein the first and second display screens oppose the first and second input devices, respectively, in the second position.

15. The system for providing text-based dialogue of claim 14, wherein the first display screen and the second display screen present the text-based data in dialogue boxes arranged in side-by-side or top-bottom configurations.

16. The system for providing text-based dialogue of claim 15, wherein the dialogue boxes arranged in a split side-by-side or a split top-bottom configuration display the text-based communication data from the first communicant and the text-based communication data from the second communicant simultaneously as the text-based communication data is received by the dialogue processor.

17. The system for providing text-based dialogue of claim 14, wherein the I/O interface includes a speech synthesizer as an input device.

18. The system for providing text-based dialogue of claim 17, further comprising an audio converter that receives input speech from the speech synthesizer and converts spoken language input speech to the entered text-based communication data in the dialogue language of the communicant upon which the speech synthesizer is used as the input device.

19. The system for providing text-based dialogue of claim 18, wherein the translation control processor translates the received input speech from the speech synthesizer to entered text-based communication data in the dialogue language of the second communicant.

20. The system for providing text-based dialogue of claim 14, wherein the I/O interface includes:

an in-range polling signal generator to seek a potential communicant with whom to conduct the text-based dialogue; and an in-range polling signal receiver to answer in-range polling signals by providing identification of the potential communicant to a sender of the in-range polling signal.

21. The system for providing text-based dialogue of claim 14, wherein the I/O interface includes an electronic connection to connect the first and second communicant systems to a telephonic communication device with which to conduct the text-based dialogue.

* * * * *